United States Patent [19]

Ritsko et al.

[11] Patent Number: 4,948,527

[45] Date of Patent: Aug. 14, 1990

[54] METHOD OF MAKING EUROPIUM ACTIVATED YTTRIUM OXIDE PHOSPHOR

[75] Inventors: Joseph E. Ritsko; Anthony F. Kasenga, both of Towanda; Scott A. Renninger, Kreamer, all of Pa.

[73] Assignee: GTE Products Corporation, Stamford, Conn.

[21] Appl. No.: 419,235

[22] Filed: Oct. 10, 1989

[51] Int. Cl.$^5$ .............................................. C09K 11/78
[52] U.S. Cl. ............................................ 252/301.4 R
[58] Field of Search ................................ 252/301.4 R

[56] References Cited

U.S. PATENT DOCUMENTS 3,870,650  3/1975  Ferri et al. .................. 252/301.4 R
4,191,662  3/1980  Mathers et al. .............. 252/301.4 R Primary Examiner—Jack Cooper
Attorney, Agent, or Firm—James Theodosopoulos

[57] ABSTRACT

A europium activated yttrium oxide phosphor is prepared as follows. Europium oxide is dissolved in nitric acid. Ammonium hydroxide is added to precipitate europium hydroxide, which is then dissolved in citric acid monohydrate to form europium citrate solution. Yttrium oxide powder is added to the solution to form a slurry, which is then spray dried. The spray dried powder is fired at a high temperature to form the phosphor.

3 Claims, No Drawings

METHOD OF MAKING EUROPIUM ACTIVATED YTTRIUM OXIDE PHOSPHOR

This invention concerns europium activated yttrium oxide phosphors. The manufacture of such phosphors is disclosed in the following U.S. Pat. Nos.: 3,322,682; 3,449,258; 3,574,131; 3,582,493; 3,635,658; 4,032,471; 4,191,662. In these patents, yttrium and europium compounds are dissolved in nitric or hydrochloric acid, and are then co-precipitated as the oxalates or sulfates. Or, as disclosed in U.S. Pat. No. 3,759,835, yttrium oxide and europium oxide powders are blended with suitable dopants, with subsequent processing steps to form the phosphor.

This invention discloses a process which does not involve co-precipitation or the blending of yttrium oxide and europium oxide powders. In this invention, europium oxide is dissolved in nitric acid. Ammonium hydroxide is then added to precipitate europium hydroxide, which is then dissolved in citric acid monohydrate to form europium citrate solution. Yttrium oxide powder is then dispersed in the europium citrate solution to form a slurry which is then spray dried. The spray dried powder is then fired at a high temperature to form europium activated yttrium oxide phosphor. This phosphor showed improved maintenance in fluorescent lamps.

In a specific example, 400 ml of $HNO_3$ was added to 133.78 grams of $Eu_2O_3$ in 2000 ml of water to form $Eu(NO_3)_3$. $NH_4OH$ was added to precipitate $Eu(OH)_3$. The $Eu(OH)_3$ was dissolved in 2000 ml of warm water and 350 grams of citric acid monohydrate to form europium citrate solution, which was then adjusted to a pH of 6.0 with $NH_4OH$. 2174 grams of $Y_2O_3$ powder were added to the europium citrate solution, along with water, to form a slurry. The slurry was then spray dried at an inlet temperature of 310° C. and an outlet temperature of 115° C. The spray dried powder was first fired to an oxide at 1000° C. for two hours in an air atmosphere furnace, and later second fired at 1600° C. for four hours in air using alumina crucibles. The fired powder was then lightly mortared, washed three times with water, filtered, dried, and sieved using 400 mesh screens. The thus-produced phosphor was compared in fluorescent lamps with a prior art co-precipitated phosphor. The respective maintenance results at 100 hours, 550 hours and 1000 hours were: 103.2% versus 97.8%; 103.9% versus 94.9%; 102.9% versus 94.1%.

We claim:

1. The method of making europium activated yttrium oxide phosphor comprising the steps of dissolving europium oxide in nitric acid, adding ammonium hydroxide thereto to precipitate europium hydroxide, dissolving the europium hydroxide in citric acid monohydrate to form europium citrate solution, dispersing yttrium oxide powder in the europium citrate solution to form a slurry, spray drying the slurry, and firing the resultant spray dried powder in air to form the phosphor.

2. The method of claim 1 wherein the europium citrate solution is adjusted to a pH of 6.0 prior to the addition thereto of the yttrium oxide powder.

3. The method of claim 1 wherein the spray dried powder is first fired in air at 1000° C. and then second-fired in air at 1600° C.

* * * * *